United States Patent [19]
Morimoto et al.

[11] Patent Number: 5,623,286
[45] Date of Patent: Apr. 22, 1997

[54] POWER SOURCE CONTROL APPARATUS FOR DISPLAY UNIT

[75] Inventors: Masayuki Morimoto; Yoshiyuki Asahina; Takehiko Tanaka; Mikita Matsuo, all of Kawasaki, Japan

[73] Assignee: Fujitsu Limited, Japan

[21] Appl. No.: 270,392

[22] Filed: Jul. 5, 1994

Related U.S. Application Data

[63] Continuation of Ser. No. 985,636, Dec. 3, 1992, abandoned.

[30] Foreign Application Priority Data

Dec. 4, 1991 [JP] Japan .................. 3-320593

[51] Int. Cl.$^6$ .................................................. G09G 5/00
[52] U.S. Cl. .................................................. 345/212
[58] Field of Search .................................. 340/720, 811, 340/813, 11; 364/707; 358/220; 345/211, 212, 213; 395/750; 348/730

[56] References Cited

U.S. PATENT DOCUMENTS

| | | | |
|---|---|---|---|
| 4,293,927 | 10/1981 | Hoshii | 395/750 |
| 4,665,536 | 5/1987 | Kim. | |
| 4,806,784 | 2/1989 | Goda | 340/811 |
| 5,059,961 | 10/1991 | Cheng | 340/720 |
| 5,065,357 | 11/1991 | Shiraishi et al. | 364/707 |
| 5,175,845 | 12/1992 | Little | 364/707 |

FOREIGN PATENT DOCUMENTS

| | | |
|---|---|---|
| 0175935A3 | 4/1986 | European Pat. Off. . |
| 0456012A2 | 11/1991 | European Pat. Off. . |
| 58-224381 | 1/1983 | Japan . |
| 63-311517 | 12/1988 | Japan . |
| 64-84320 | 3/1989 | Japan . |
| 2064835 | 6/1981 | United Kingdom . |

*Primary Examiner*—Jeffery Brier
*Attorney, Agent, or Firm*—Greer, Burns & Crain, Ltd.

[57] ABSTRACT

A power source control apparatus controls a power source of a display unit of a system which includes an input device and a computer body. The power source control apparatus includes a first part for detecting an input signal which is output from the input device and for turning ON the power source of the display unit based on the detection of the input signal in a state where the power source is OFF, a second part for turning OFF the power source of the display unit if the first part detects no input signal for a predetermined time, and a third part for transmitting to the computer body second and subsequent input signals detected by the first part, so that the power source of the display unit is automatically turned ON in response to the input signal from the input device, but only the second and subsequent input signals are transmitted to the main body. In other words, the first input signal is blocked and is not transmitted to the main body, so that the state of the main body at the time when the power source of the display unit is turned ON is correctly displayed on the display unit.

17 Claims, 7 Drawing Sheets

POWER SOURCE CONTROL APPARATUS FOR DISPLAY UNIT

This is a continuation of application Ser. No. 07/985,636, filed on Dec. 3, 1992 now abandoned.

BACKGROUND OF THE INVENTION

The present invention generally relates to power source control apparatuses, and more particularly to a power source control apparatus for automatically turning ON/OFF a power source of a display unit depending on the existence of an input signal.

Recently, computers, personal computers and the like (hereinafter simply referred to as main bodies) are more frequently operated unattended in a continuous manner. For this reason, in order to prevent burnout and extend the serviceable life of a cathode ray tube (CRT) which is connected to the main body during the unattended operation, there are demands to turn OFF a CRT power source. In this case, the main body operates even if the CRT power source is turned OFF.

Conventionally, an input signal from an input device such as a keyboard is monitored, and the CRT power source is turned OFF if the input signal is not received for a predetermined time. The CRT power source is turned ON when the input signal is detected.

But when turning ON the CRT power source when the input signal is detected, it is necessary to display the state of the main body at the time when the CRT power source is turned ON, because the main body continues to operate even while the CRT power source is OFF. Hence, according to the conventional method of turning ON the CRT power source when the input signal is detected, the input signal is transmitted to the main body in addition to turning ON the CRT power source when the input signal is detected.

As described above, the main body continues to operate even while the CRT power source is OFF. For this reason, if the input signal is input from the keyboard, a software of the main body will operate in response to this input signal. Therefore, if the CRT power source is turned ON by generating the input signal by manipulating an arbitrary key of the keyboard, a mouse or the like in the state where the CRT power source is OFF, the state of the main body at the time when the CRT power source is turned ON is not correctly displayed on the CRT. In other words, the actual display on the CRT relates to the state of the main body which carries out an erroneous operation in response to the input signal.

SUMMARY OF THE INVENTION

Accordingly, it is a general object of the present invention to provide a novel and useful power source control apparatus in which the problems described above are eliminated.

Another and more specific object of the present invention is to provide a power source control apparatus for controlling a power source of a display unit of a system which includes an input device and a computer body, comprising first means for detecting an input signal which is output from the input device, and for turning ON the power source of the display unit based on the detection of the input signal in a state where the power source is OFF, second means, coupled to the first means, for turning OFF the power source of the display unit if the first means detects no input signal for a predetermined time, and third means, coupled to the first means, for transmitting to the computer body second and subsequent input signals detected by the first means. According to the power source control apparatus of the present invention, the power source of the display unit is automatically turned ON in response to the input signal from the input device, but only the second and subsequent input signals are transmitted to the main body. In other words, the first input signal is blocked and is not transmitted to the main body, so that the state of the main body at the time when the power source of the display unit is turned ON is correctly displayed on the display unit.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 1.

Figure 1:
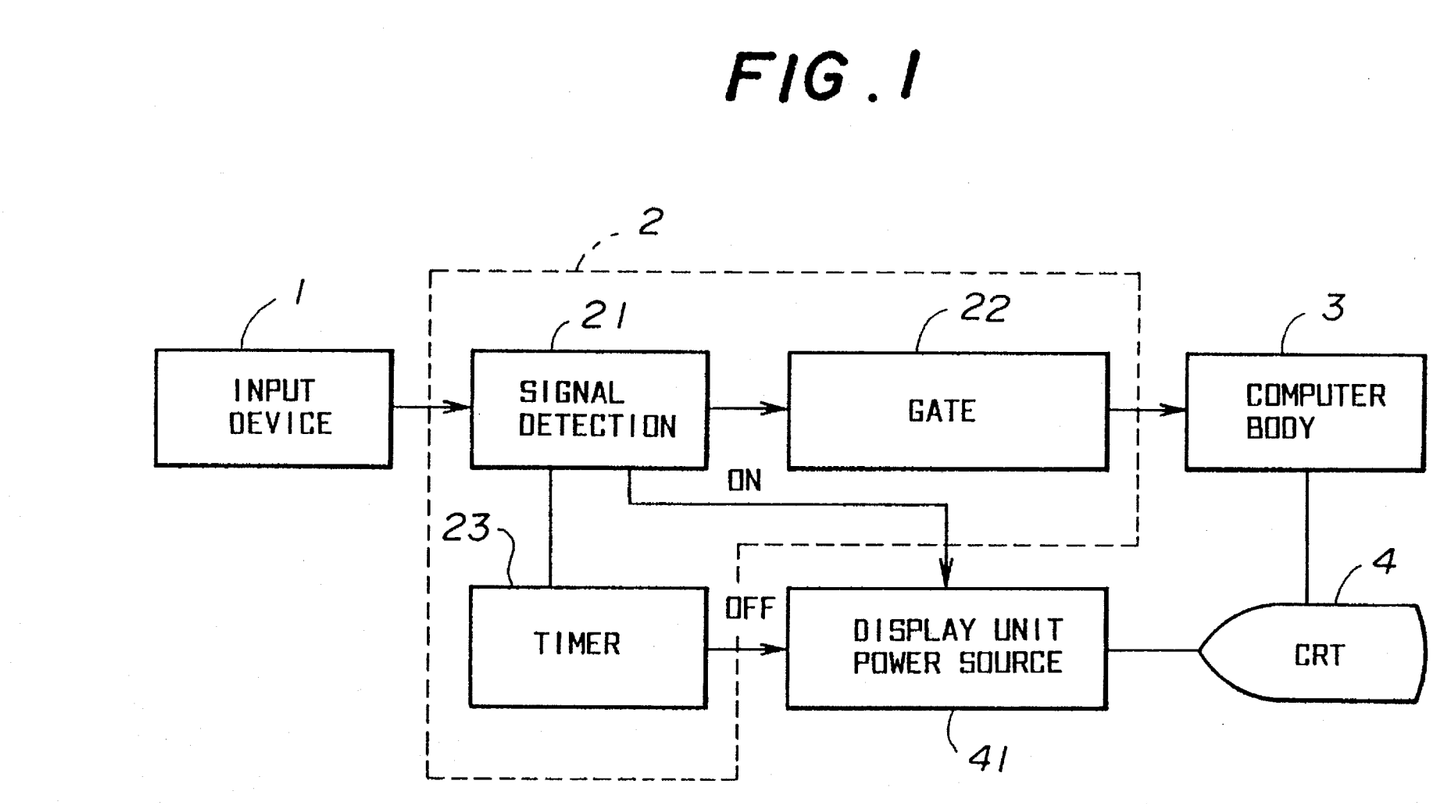
FIG. 1 is a system block diagram for explaining the operating principle of the present invention.

In FIG. 1, a power source control apparatus 2 includes a signal detection circuit 21 for detecting an input signal from an input device 1, a gate circuit 22 which determines whether or not to transmit the input signal detected by the signal detection circuit 21 to a computer body (main body) 3, and a timer circuit 23 for turning OFF a power source 41 of a display unit (CRT) 4 if the signal detection circuit 21 detects no input signal for a predetermined time.

When the power source 41 of the display unit 4 is OFF, the signal detection circuit 21 turns ON the power source 41 based on the input signal. In addition, the gate circuit 22 transmits the second and subsequent input signals detected by the signal detection circuit 21 to the computer body 3. When the signal detection circuit 21 detects the first input signal from the input device 1, the signal detection circuit 21 turns ON the power source 41 of the display unit 4.

In a state where the power source 41 of the display unit 4 is ON, the input signal from the input device 1 is transmitted to the computer body 3 via the signal detection circuit 21 and the gate circuit 22. The timer circuit 23 is reset and starts to count every time an input signal is received from the input device 1. The timer circuit 23 does not operate if the next input signal is received within a predetermined (or preset) time from the receipt of the immediately previous input signal. However, if the next input signal is not detected by the signal detection circuit 21 within the predetermined time, the timer circuit 23 turns OFF the power source 41 of the display unit 4.

If an input signal is received in a state where the power source 41 of the display unit 4 is OFF, the signal detection circuit 21 turns ON the power source 41 based on a first input signal. The gate circuit 22 opens its gate after the first input signal is received and before a second input signal is received, and transmits the second and subsequent input signals to the computer body 3. Accordingly, the first input signal which requests the power source 41 to be turned ON is not transmitted to the computer body 3, and thus, the computer body 3 will not carry out an erroneous operation in response to the first input signal. As a result, the state of the computer body 3 at the time when the power source 41 is turned ON is correctly displayed on the display unit 4.

Figure 2:
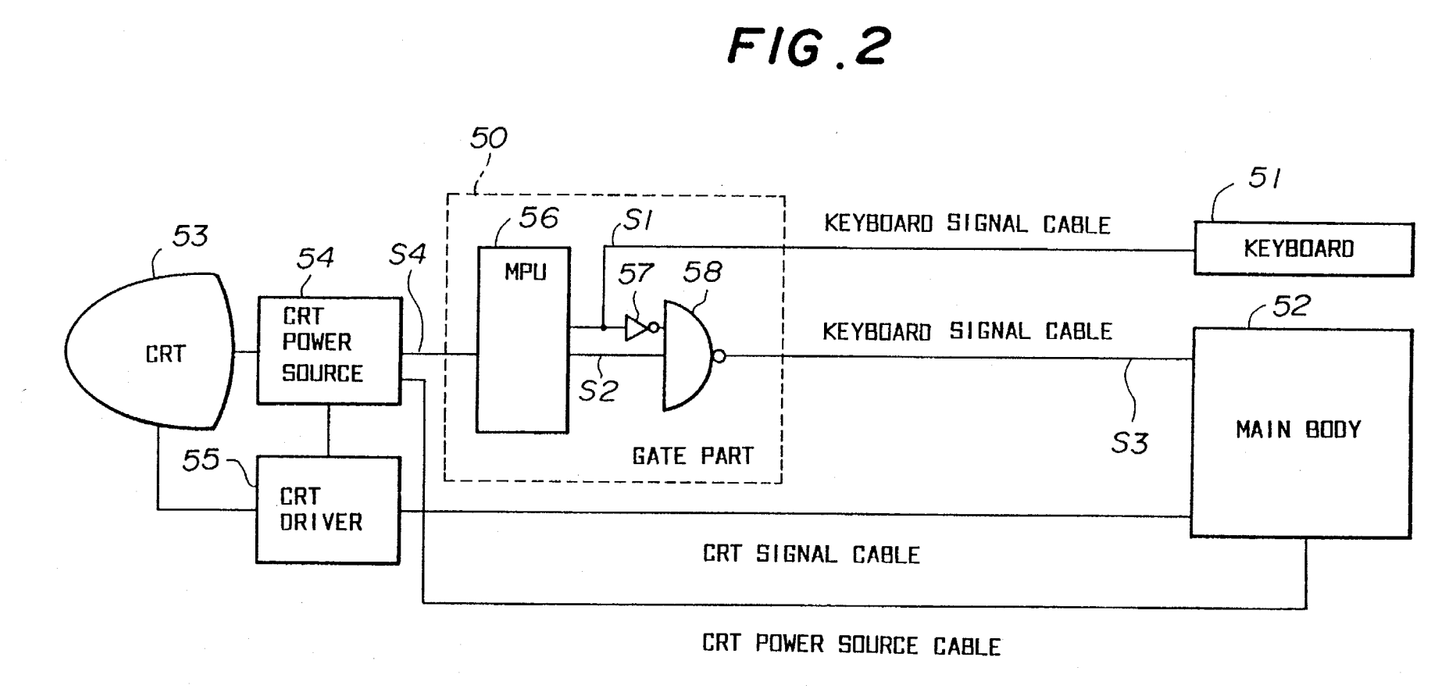
FIG. 2 is a system block diagram showing an embodiment of a power source control apparatus according to the present invention.

Next, a description will be given of an embodiment of a power source control apparatus according to the present invention, by referring to FIGS. 2 and 3. FIG. 2 shows the embodiment of the power source control apparatus, and FIG. 3 shows a personal computer including this embodiment of the power source control apparatus.

Figure 3:
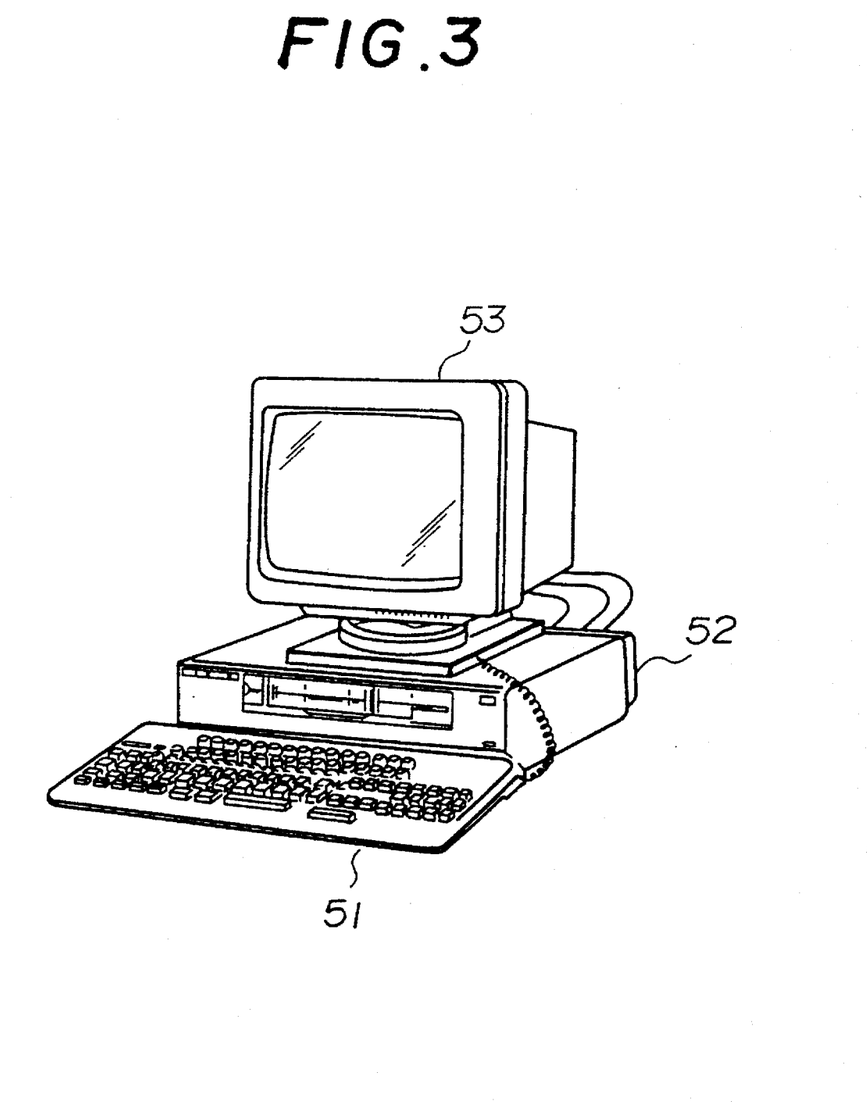
FIG. 3 is a perspective view of a personal computer including the embodiment of the power source control apparatus.

In FIGS. 2 and 3, a display unit power source controller 50 transmits an input signal from a keyboard 51 to a main body 52, and also controls the ON/OFF state of a power source 54 of a CRT 53. The display screen of the CRT 53 is controlled by a CRT driver circuit 55.

A microprocessor unit (MPU) 56 detects the input signal from the keyboard 51, and turns the power source 54 ON if the power source 54 is OFF. The MPU 56 includes the functions of a signal detection circuit which outputs a gate signal for opening a gate part 58 after a predetermined time elapses from a time when a first input signal is received and before a second input signal is received, and the functions of a timer circuit which is reset by the input signal and starts to operate so as to turn OFF the power-source 54 if the next input signal is not received even after the predetermined time elapses. The gate part 58 is a NAND circuit which receives the input signal via an inverter 57 and a gate control signal, both from the MPU 56.

Figure 4:
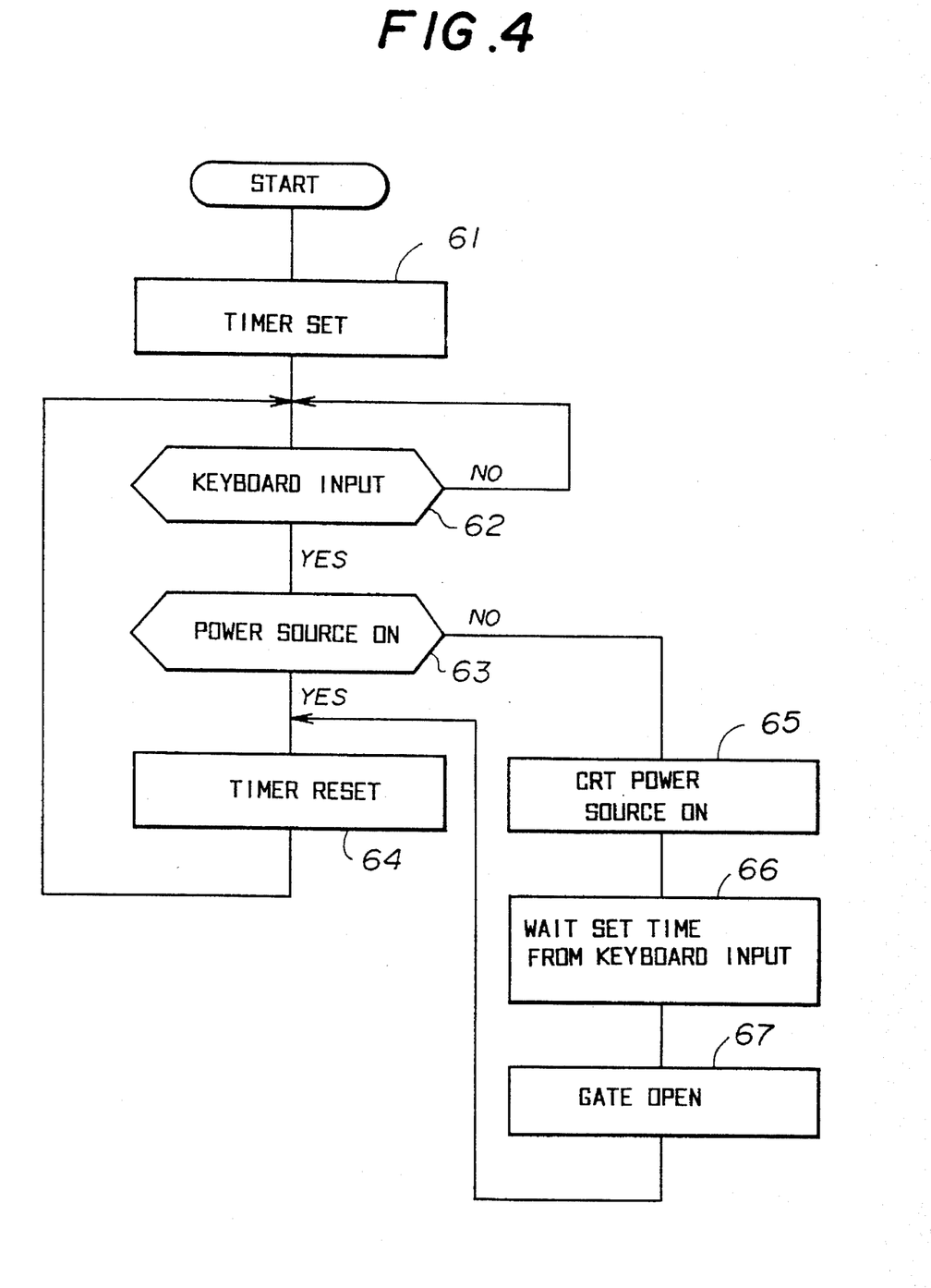
FIG. 4 is a flow chart for explaining the operation of the embodiment of the power source control apparatus.
Figure 5:
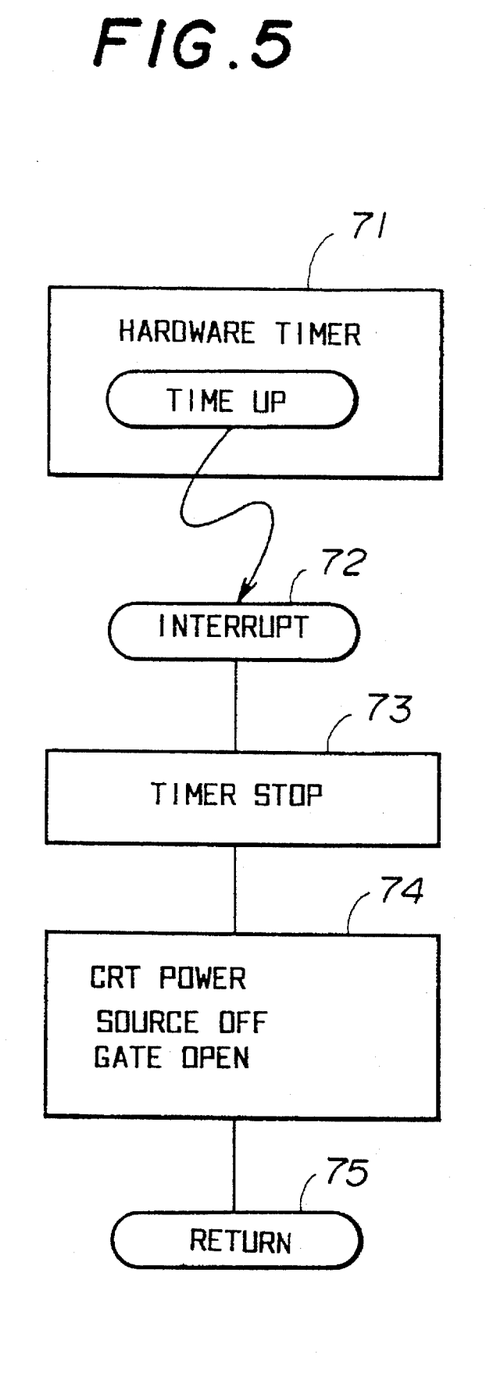
FIG. 5 is a flow chart for explaining a timer interrupt of the embodiment of the power source control apparatus.

FIG. 4 is a flow chart for explaining the operation of this embodiment, and FIG. 5 is a flow chart for explaining a timer interrupt of this embodiment.

FIG. 4 shows the operation of the MPU 56. In FIG. 4, a step 61 sets an internal timer of the MPU 56 so that the internal timer operates if the input signal is not input for a time t. For example, the time t can be set to 10 seconds, 15 minutes, 30 minutes, one hour, 12 hours or the like. In this embodiment, the time t of 10 seconds is used for testing purposes. Then, a step 62 constantly monitors the input from the keyboard 51, so as to decide whether or not an input signal is received from the keyboard 51. When the decision result in the step 62 becomes YES, a step 63 decides whether or not the power source 54 is already ON. If the decision result in the step 63 is YES, a step 64 resets the internal timer, and the process returns to the step 62.

On the other hand, if the decision result in the step 63 is NO, a step 65 turns ON the power source 54. Then, a step 66 waits for a predetermined after the input of the first input signal is completed and before the second input signal is input. A step 67 opens the gate part 58 which is provided in a communication path between the keyboard 51 and the main body 52, and the process advances to the step 64 described above.

In FIG. 5, a step 71 times the predetermined time from the time when the internal timer of the MPU 56 is reset. When the predetermined time elapses, a step 72 makes an interrupt, and a step 73 stops the internal timer. A step 74 turns OFF the power source 54 and closes the gate part 58. Thereafter, the process returns to the step 62 shown in FIG. 4, that is, to the keyboard data input monitoring routine.

Figure 6:
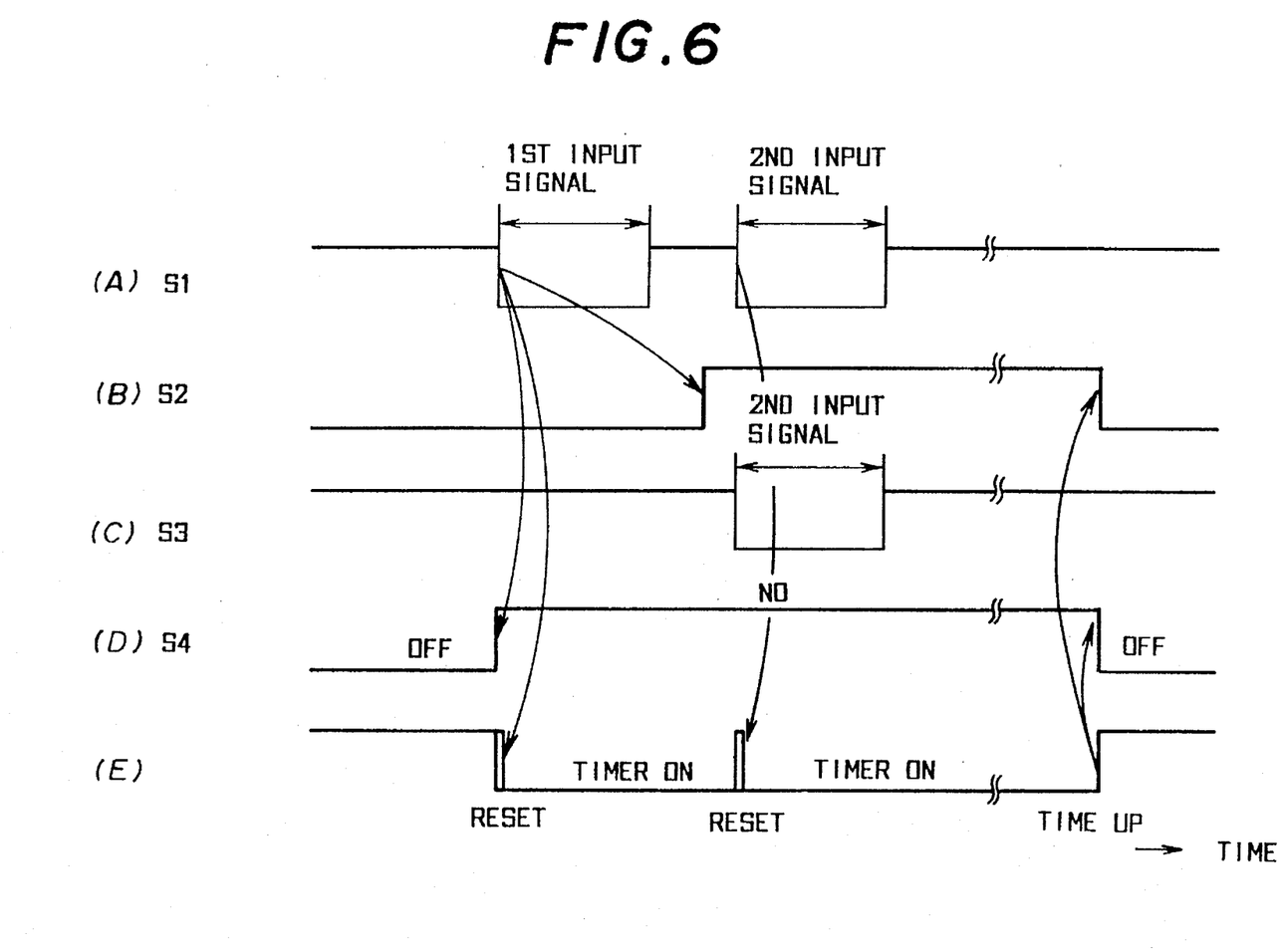
FIG. 6 is a timing chart for explaining the operation of the embodiment of the power source control apparatus.

FIG. 6 is a timing chart for explaining the operation of this embodiment. In FIG. 6, (A) shows the input signal S1 shown in FIG. 2, (B) shows the gate control signal S2 shown in FIG. 2, (C) shows a gate output signal S3 shown in FIG. 2, (D) shows an ON/OFF state S4 of the power source 54, and (E) shows the operation of the internal timer of the MPU 56.

In FIG. 6, when the first input signal is input to the MPU 56 as the input signal S1 in the state where the power source 54 is OFF, the power source 54 is turned ON and the internal timer of the MPU 56 is reset. The gate control signal S2 is turned ON and the gate part 58 is opened after the predetermined time elapses after the first input signal is input and before the second input signal is input.

Next, when the second input signal is output from the keyboard 51, this second input signal is transmitted to the main body 52 via the gate part 58. The internal timer of the MPU 56 is reset and the internal timer starts to operate. When the input signals subsequent to the second input signal are successively input thereafter, these subsequent input signals are transmitted as they are to the main body 52, and the internal timer is reset every time one of the subsequent input signals is received by the MPU 56. After the last input signal is received by the MPU 56 and the internal timer times the predetermined time, the power source 54 is turned OFF and the gate part 58 is closed.

Figure 7A:
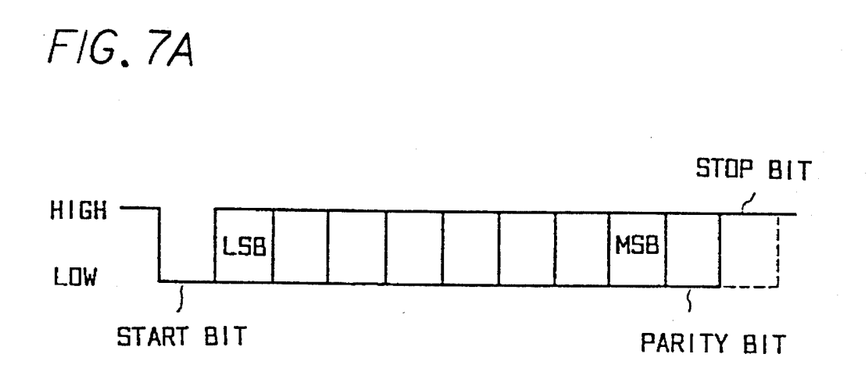
FIGS. 7A and 7B are diagrams for explaining data formats used in the embodiment of the power source control apparatus.
Figure 7B:
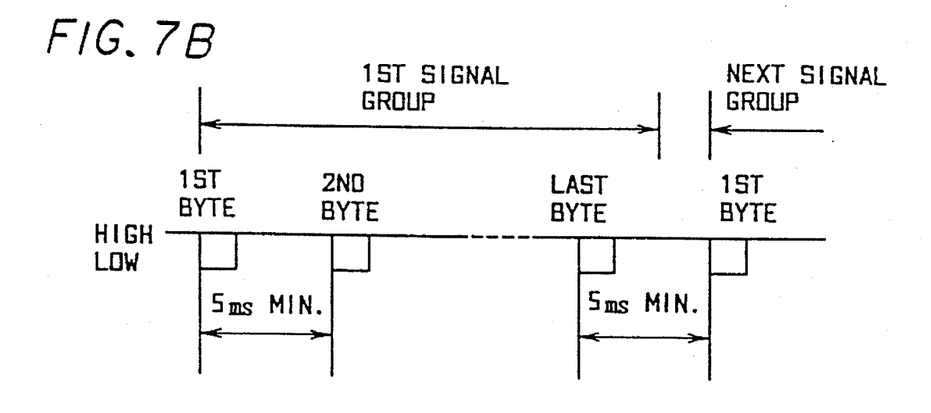

FIG. 7 shows data formats used in this embodiment. The data input from the keyboard 51 has a serial data format having one byte units.

In FIG. 7, (a) shows the data structure of one byte of the signal data. In this case, a start bit is arranged before a 8-bit signal data, and a parity bit and a stop bit are added after the 8-bit signal data. Hence, the 1-byte signal data is made up of a total of 11 bits.

On the other hand, (b) in FIG. 7 shows the mutual interval of such 1-byte signal data. As shown, a minimum of 5 ms is provided between two adjacent 1-byte signal data. Accordingly, it is possible to determine the predetermined time of the gate control signal S2 shown in FIG. 6.

Therefore, according to this embodiment, the power source 54 of the CRT 53 is normally turned ON and the display is made on the CRT 53 when the power source of the main body 52 (personal computer) is turned ON. On the other hand, if no key input is made from the keyboard 51 for the predetermined time, the power source of the main body 52 remains ON, but the power source 54 of the CRT 53 is turned OFF and the display on the CRT 53 disappears. If the key input is made from the keyboard 51 in this state where the power source 54 of the CRT 53 is OFF, the power source 54 is turned ON and the state of the main body 52 at the time when the power source 54 is turned ON is correctly displayed on the CRT 53.

In addition, the power source controller 50 can take the form of an adapter which may be connected to the existing system, without the need to modify the main body 52, the keyboard 51 and the like. As may be readily seen from FIG. 2, those parts of the system other than the power source controller 50 which is indicated by the broken line may be the same as corresponding parts of an existing system, and no hardware modification of the main body 52 or the keyboard 51 is necessary.

Further, the present invention is not limited to these embodiments, but various variations and modifications may be made without departing from the scope of the present invention.

What is claimed is:

1. A power source control apparatus for independently controlling a power source of a display unit of a system which includes an input device and a computer body, said power source control apparatus being connected to the input device, said input device being coupled to the computer body via said power source control apparatus, said power source control apparatus comprising:

first means for detecting an input signal which is output from the input device, and for turning ON the power source of the display unit independently from said computer body based on the detection of a first signal in a state where the power source is OFF;

second means, coupled to said first means, for independently turning OFF the power source of the display unit without affecting operations of said computer body if said first means detects no input signal for a predetermined time; and third means, coupled to said first means, for blocking said first input signal and transmitting to the computer body subsequent input signals detected by said first means only when the power source of the display unit is ON, said first, second and third means being independent of the computer body.

2. The power source control apparatus as claimed in claim 1, wherein said first means turns ON the power source of the display unit when said first input signal is detected in the state where the power source is OFF, said first input signal being the input signal which is first received from the input device by said first means in the state where the power source is OFF.

3. The power source control apparatus as claimed in claim 1, wherein said first means and said second means form a microprocessor unit, and said second means includes an internal timer of the microprocessor unit.

4. The power source control apparatus as claimed in claim 3, wherein said third means includes a gate circuit which blocks the first input signal from being transmitted to the computer body in response to a gate control signal output from said first means.

5. The power source control apparatus as claimed in claim 1, wherein said third means includes a gate circuit which blocks the first input signal from being transmitted to the computer body in response to a gate control signal output from said first means.

6. The power source control apparatus as claimed in claim 1, wherein the display unit is made up of a cathode ray tube, and a power source of the computer body normally remains ON regardless of the ON/OFF state of the power source of the display unit.

7. The power source control apparatus as claimed in claim 1, wherein said first means turns ON the power source of the display unit when a first input signal is detected in the state where the power source is OFF, said first input signal being the input signal which is first received from the input device by said first means in the state where the power source is OFF, and said third means transmits to the computer body only the second and subsequent input signals detected by said first means.

8. The power source control apparatus as claimed in claim 1, wherein said first through third means form an adapter which connects to an existing system, said existing system including at least the display unit, the power source, the input device and the computer body.

9. A power source control apparatus for independently controlling a power source of a display unit of a system which includes an input device and a computer body, said power source control apparatus being connected to the input device, said input device being coupled to the computer body via said power source control apparatus, said power source control apparatus comprising:

a signal detection circuit detecting a first input signal output from the input device, said first input signal turning ON only the power source of the display unit;

a timer, coupled to said signal detection circuit, for independently turning OFF the power source of the display unit without affecting operations of said computer main body if said signal detection circuit detects no input signal from the input device within a predetermined time; and a gate circuit, coupled to said signal detection circuit, for blocking said first input signal and transmitting to the computer body second and subsequent input signals output from the input device and received by said signal detection circuit at a timing after said first input signal when the power source of the display unit is ON, and supplying no second and subsequent input signals to the computer body when the power source of the display unit is OFF, said signal detection circuit, said timer and said gate circuit being independent of the computer body.

10. The power source control apparatus as claimed in claim 9, wherein said signal detection circuit turns ON the power source of the display unit when said first input signal is detected in the state where the power source is OFF, said first input signal being the input signal which is first received from the input device by said signal detection circuit in the state where the power source is OFF.

11. The power source control apparatus as claimed in claim 9, wherein said signal detection circuit and said timer form a microprocessor unit, and said timer includes an internal timer of the microprocessor unit.

12. The power source control apparatus as claimed in claim 11, wherein said gate circuit blocks the first input signal from being transmitted to the computer body in response to a gate control signal output from said signal detection circuit.

13. The power source control apparatus as claimed in claim 9, wherein said gate circuit blocks the first input signal from being transmitted to the computer body in response to a gate control signal output from said signal detection circuit.

14. The power source control apparatus as claimed in claim 9, wherein the display unit comprises of a cathode ray tube, and a power source of the computer body normally remains ON regardless of the ON/OFF state of the power source of the display unit.

15. The power source control apparatus as claimed in claim 9, wherein said signal detection circuit turns ON the power source of the display unit when a first input signal is detected in the state where the power source is OFF, said first input signal being the input signal which is first received from the input device by said signal detection circuit in the state where the power source is OFF, and said gate circuit transmits to the computer body only the second and subsequent input signals detected by said signal detection circuit.

16. The power source control apparatus as claimed in claim 9, wherein said signal detection circuit, said timer and said gate circuit form an adapter which connects to an existing system, said existing system including at least the display unit, the power source, the input device and the computer body.

17. A power source control apparatus for independently controlling a power source of a display unit of a computer system, the computer system including an input device, a computer body and said display unit, said power source control apparatus being connected to the input device and residing external to said computer body, said power source control apparatus comprising:

- a signal detection circuit for detecting a signal output from the input device, said signal output from the input device turning ON only the power source of the display unit;
- a timer, coupled to said signal detection circuit, for independently turning OFF the power source of the display unit without affecting operation of said computer body if said signal detection circuit detects no output signal from the input device within a predetermined time; and
- a gate circuit, coupled to said signal detection circuit, for blocking said first input signal and allowing subsequent output signals from the input device to be transmitted to the computer body when the power source of the display unit is ON, and prohibiting subsequent output signals from the input device to be transmitted to the computer body when the power source of the display unit is OFF.

* * * * *